E. O. Dow,

Billiard Wire Stop.

No. 100,509.   Patented Mar. 8, 1870.

Witnesses.
G. L. Chapin
W. H. Brown

Inventor.
Edwin O. Dow

United States Patent Office.

EDWIN O. DOW, OF CHICAGO, ILLINOIS.

Letters Patent No. 100,509, dated March 8, 1870.

STOP- FOR BILLIARD-WIRES.

The Schedule referred to in these Letters Patent and making part of the same

*To all whom it may concern:*

Be it known that I, EDWIN O. DOW, of Chicago, in the county of Cook, and State of Illinois, have invented an "Improved Stop for Billiard-Wires;" and I do hereby declare that the following is a full, clear, and exact description thereof, which will enable those skilled in the art to make and use the same, reference being had to the accompanying drawings and letters marked thereon making a part of this description, in which—

Figure 1:
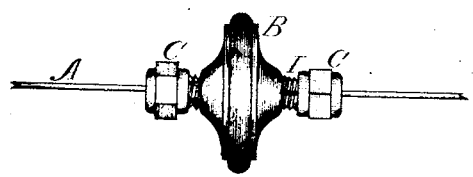

Figure 1 is an elevation of my invention.

Figure 2:

Figure 2, an elevation of the slotted screw which is attached to the billiard-wire.

The present invention consists in placing on a billiard-wire a hollow screw, which is so slotted out at its ends that when nuts are turned thereon the screw will be firmly clamped to the aforesaid wire, and be thus held in place, the screw between the nuts being provided with any suitable ornament most desirable or convenient.

The object of the invention is to provide stops for billiard-wires which cannot be moved by shoving the counters from one stop to another, as the whole is hereinafter fully described.

1 represents a cylindrical piece of metal or other suitable material, which is somewhat tapered at its ends, so that when screw-threads are cut thereon the nuts C C will clamp it to the billiard-wire A. Slots J being made in the screw, allow it sufficiently to contract to grasp the wire firmly.

In making the device, however, only one of the ends of the screw I need be slotted, as one nut will hold the screw to the wire A, but for convenience and ornament two nuts are used, so that a whirl or knob, B, may be placed between the nuts C, as shown in fig. 1.

This invention will be better understood when it is known that there has been great difficulty experienced in fastening stops to wires so that when the counters are moved back and forth they will not move the stops.

As a general rule, the wire A is stretched from the vertical walls of a room, and to it one central and two outside stops are fastened, but, as no means have been provided for adjusting the stops to any particular part of the wire, I have provided the above-described device, which fully answers the purpose.

Having thus fully described my invention,

What I claim, and desire to secure by Letters Patent of the United States, is—

A billiard wire, A, provided with a slotted, tapered, and hollow screw, I, which is clamped to said wire by means of one or more nuts C, in combination with the whirl B, as and for the purpose set forth.

EDWIN O. DOW.

Witnesses:
G. L. CHAPIN,
W. C. BENSON.